United States Patent [19]

Pobgee

[11] 4,164,622
[45] Aug. 14, 1979

[54] GRAPHICAL INPUT APPARATUS FOR ELECTRICAL EQUIPMENT

[75] Inventor: Peter J. Pobgee, Surbiton, England

[73] Assignee: National Research Development Corporation, London, England

[21] Appl. No.: 884,549

[22] Filed: Mar. 8, 1978

[30] Foreign Application Priority Data

Mar. 9, 1977 [GB] United Kingdom ............... 09945/77

[51] Int. Cl.² ............................................. G08C 21/00
[52] U.S. Cl. ..................................................... 178/18
[58] Field of Search ............................. 178/18, 19, 20; 340/365 C, 347 AD; 338/90; 33/1 M; 200/46; 323/63

[56] References Cited

U.S. PATENT DOCUMENTS

| | | | |
|---|---|---|---|
| 2,907,824 | 10/1959 | Peek, Jr. .................................. | 178/18 |
| 2,975,235 | 3/1961 | Leitner et al. .......................... | 178/18 |
| 3,304,612 | 2/1967 | Proctor et al. ............... | 340/347 AD |
| 3,308,253 | 3/1967 | Krakinowski .......................... | 200/46 |
| 3,440,522 | 4/1969 | Kruse ..................................... | 323/63 |
| 3,885,097 | 5/1975 | Pobgee .................................... | 178/18 |
| 3,925,610 | 12/1975 | French et al. .......................... | 178/18 |
| 3,959,585 | 5/1976 | Mattes et al. ........................... | 178/18 |
| 4,013,835 | 3/1977 | Eachus et al. ........................... | 178/18 |
| 4,080,514 | 3/1978 | Pobgee .................................... | 178/18 |

Primary Examiner—Thomas A. Robinson
Attorney, Agent, or Firm—Cushman, Darby & Cushman

[57] ABSTRACT

A graphical input tablet is disclosed in which a sheet of resistive material is stretched across a surface comprising parallel conductors on, but insulated from, a resistive layer. Currents are passed alternately through the resistive layer and means which places the conductors at different graduated voltages. Thus when a stylus used to indicate a point causes the sheet to bridge the resistive layer to one of the conductors, alternate voltages representative of two co-ordinates of the position of the point are developed.

5 Claims, 5 Drawing Figures

GRAPHICAL INPUT APPARATUS FOR ELECTRICAL EQUIPMENT

The present invention relates to the determination of the co-ordinates of a point indicated, for example, by using a stylus on a surface. The invention is particularly, but not exclusively, useful as an input device for a computer or for telegraphic apparatus, where the input is to be in the form of writing, charts, graphs or drawings.

The invention is related to the apparatus in U.S. Pat. No. 3,885,097, which relies on a voltage gradient developed in a resistive sheet suspended above a resistive base member. In operation, a stylus used to indicate a point on the sheet, deforms the sheet to make contact locally with the base member and voltages picked off from the sheet and the base member indicate the co-ordinates of the point.

Since the sheet is constantly deformed while in use, often beyond the elastic limit of the sheet material, its useful life is curtailed. Furthermore for accurate operation the resistivity of the sheet should be linear but it is difficult to achieve a linearity which gives the required precision.

According to the present invention there is provided apparatus for obtaining signals representative of the co-ordinates of a point indicated in a working area, including a sheet of electrically conductive or resistive material held in position across the surface of a fixed member, the said surface comprising a plurality of parallel conductors spaced apart from each other and supported on a resistive layer by means of insulating supports, resistive means for so connecting with the parallel conductors that when a current is passed between two terminals of the resistive means a voltage gradient is set up from conductor to conductor in the direction at right angles to the conductors, the sheet being held in position adjacent to, but out of contact with, the said surface unless its resistance is such that when it rests across the said surface on the parallel conductors it does not materially affect the said voltage gradient, when it may be either in contact, or not in contact with the said surface, and the sheet being of such material and/or so mounted that when pressed towards the surface by means indicating the position of a point it bridges any of the parallel conductors in the locality of the point to the resistive layer, changeover means for causing current supplied to the apparatus to flow alternately in two paths, a first path in which the current flowing in the resistive means sets up a voltage gradient across the parallel conductors and at right angles thereto, and a second path in which the current flowing in the resistive layer sets up a voltage gradient in a direction parallel to the conductors, and means for deriving first and second signals when the sheet is pressed at a relatively small area to bridge at least one of the parallel conductors to the resistive layer, the first signal being dependent on the voltage of the parallel conductors when current flows in the resistive layer, and the second signal being dependent on the voltage of the resistive layer when current flows in the resistive means, and the first and second signals being representative of first and second co-ordinates of the said small area, respectively.

The resistive means preferably comprises a pair of elongated resistive members positioned in contact with the parallel conductors at right angles thereto and at or adjacent to opposite ends thereof.

While the resistive layer preferably comprises a homogeneous layer of resistive material with connections formed by elongated conductors in contact with a pair of opposite edges of the layer, the resistive layer may as an alternative comprise a plurality of parallel conductors spaced apart from each other and further resistive means for so connecting the parallel conductors of the resistive layer that when a current is passed between two terminals of the further resistive means a voltage gradient is set up from conductor to conductor in the direction at right angles to the conductors of the resistive layer.

The material of the sheet is preferably resistive and it is advantageous if the resistance varies with pressure, discrimination then being possible between the low pressure per unit area applied, for example, by a hand, to the sheet and the relatively high pressure per unit area applied when a stylus is used to indicate a point whose co-ordinates are required.

Certain embodiments of the invention will now be described, by way of example, with reference to the accompanying drawings, in which.

Figure 1:
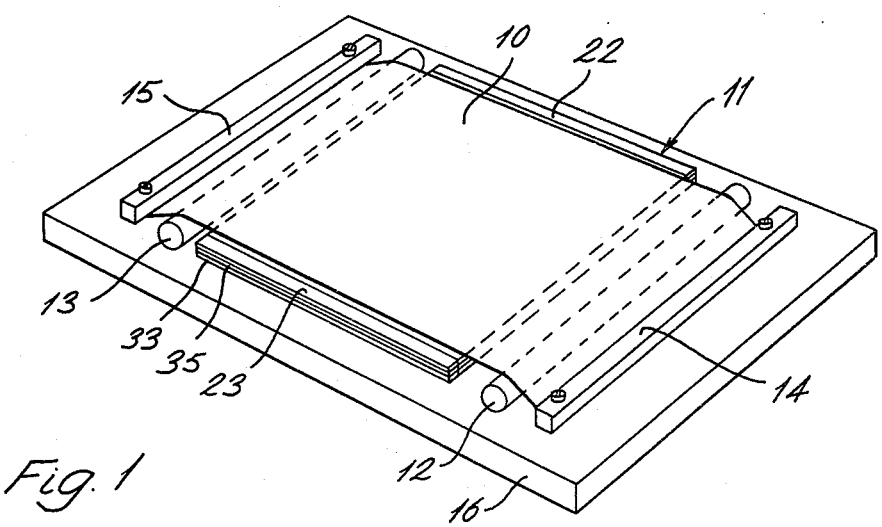
FIG. 1 shows a graphical input tablet according to the invention.
Figure 3:
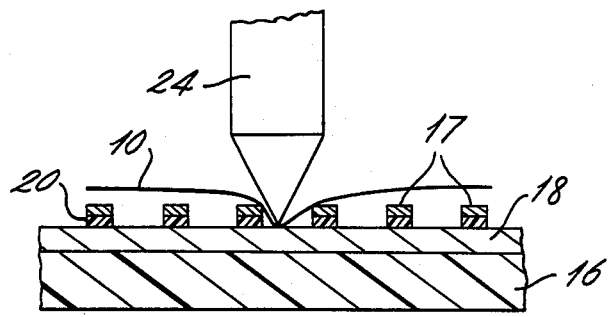
Figure 5:
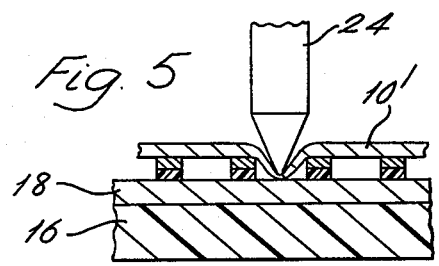
Figure 4:
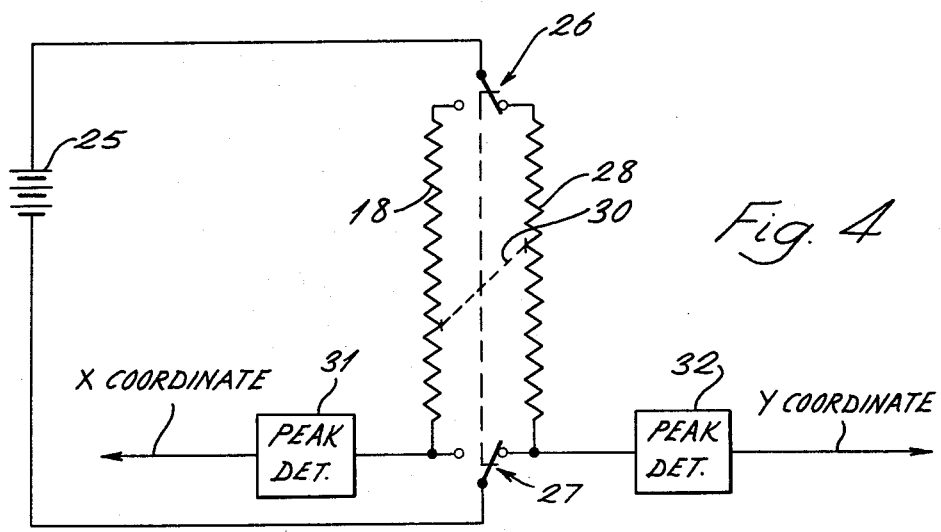

FIG. 3 shows an enlarged cross-section through a further fragment of the tablet of FIG. 1 when a stylus is used to indicate the position of a point on the upper sheet of the tablet, FIG. 4 is a schematic circuit diagram of one arrangement for obtaining co-ordinate signals from the apparatus of FIG. 1, and FIG. 5 shows an enlarged cross-section through another fragment of a tablet similar to that of FIG. 1 but which employs a sheet 10' of variable resistance material.

Figure 2:
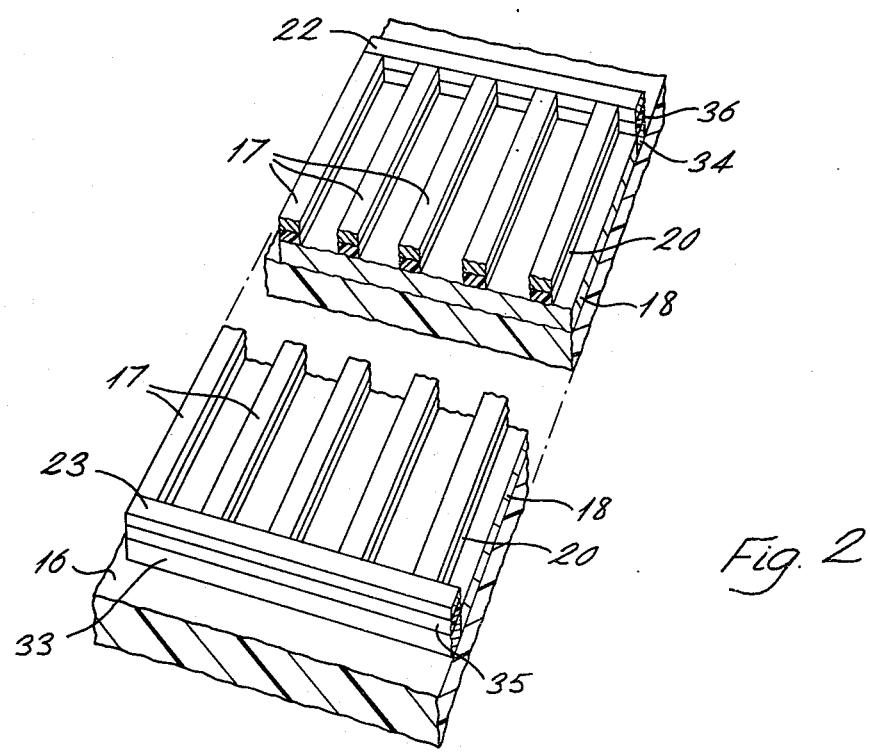
FIG. 2 shows an enlarged fragment of the tablet of FIG. 1.

(Note: In FIGS. 2, 3 and 5 the vertical scale is exaggerated so that the various conducting and insulating strips and resistive layers can be clearly seen).

The graphical input table shown in FIG. 1 comprises a flexible resistive sheet 10 stretched across, but spaced from, a fixed member 11 by means of supports 12 and 13 and insulating clamps 14 and 15 screwed to a base member 16. As appears more clearly from FIG. 2 which shows a fragment of the fixed member 11, a plurality of conducting strips, such as the strip designated 17, are supported on a resistive layer 18 by means of insulating strips immediately under each conductive strip. For example the conducting strip 17 is supported on the insulating strip 20. The conductive strips are connected together at the far side of the tablet as shown in FIG. 1 by means of a longitudinal resistive member 22 and a similar resistive elongated member 23 connects the conducting strips on the near side of the tablet. Longitudinal conductors 33 and 34 are connected to the resistive layer and are under and parallel to the members 22 and 23 but insulated therefrom by insulators 35 and 36, respectively.

Current from a battery 25 (see FIG. 4) is alternately passed by means of synchronously operated switches 26 and 27 through the resistive layer 18 and a resistor 28 representing the resistive members 22 and 23 and the conductive strips. Connections from the switches 26 and 27 to the conductors 33 and 34, and the resistive members 22 and 23 are not shown in FIGS. 1 to 3.

Resistive members 22 and 23 are so connected to the switches that when current flows in these two members it flows in parallel in the members from left to right as seen in FIG. 1. Hence voltage gradient is set up in each of these resistive members and the conductive strips take up voltages depending on their position in relative to the members 22 and 23. In this way a voltage gradient is set up across the conductive strips at right angles thereto from one side of the tablet to the other. When a voltage is applied between the conductors 33 and 34 current flows in the resistive layer 18 substantially in the direction substantially parallel to the conductive strips and sets up a voltage gradient in the resistive layer which is also parallel to the strips.

When a graphical input such as a word or a diagram is to be entered into a machine coupled to the graphical input tablet of FIG. 1, a stylus such as that indicated at 24 in FIG. 3, which is usually an ordinary pen or pencil for example, is used to write the word or draw the diagram on the sheet 10 or on an overlay, such as a sheet of paper, for the sheet 10. The x and y co-ordinates at right angles to, and parallel to, the strips, respectively, of a large number of points in lines traced out by the stylus are obtained and transmitted to the machine.

As the stylus is used it indicates the position of each of a number of points on the sheet 10 by deforming it so that strips are locally bridged to the resistive member. As each point is indicated at least one of the strips is connected to the resistive layer by means of the sheet 10, such a connection being indicated at 30 in FIG. 4. When the switches 26 and 27 are in the position shown in FIG. 4 and current flows through the resistive members 22 and 23 setting up the voltage gradient across and at right angles to the strips, no current flows in the resistive layer 18 which can therefore be used to pick off a voltage corresponding to the x co-ordinate of the point where the stylus is applied by way of the contact 30. When the switches 26 and 27 take up their other state and current flows through the resistive layer 18 from the far edge to the near edge as seen in FIG. 1 setting up the voltage gradient parallel to the strips, the bridging action of the sheet 10 when pressed into contact with the resistive layer 18 allows the conductive strips and the members 22 and 23 (not now carrying a current) to pick off a voltage corresponding to the y co-ordinate. High impedance peak detector circuits 31 and 32 are connected to the conductor 33 and the resistive member 23, respectively, to provide output signals representative of the x and y co-ordinates of the point indicated by the stylus, as the switches 26 and 27 cycle from state to state.

The resistive layer 18 may be replaced by a composite layer (not shown) comprising conductive strips at right angles to the strips shown in FIG. 1 spaced from one another by insulating material. The conductive strips in the composite layer are connected at their ends by resistive members so that a voltage gradient developed in these resistive members is carried across the working area of the tablet by the strips in the composite layer. In this way when the resistive sheet 10 bridges the upper conductive strips to those in the composite layer, x and y co-ordinate signals are developed in a way similar to that described above.

The switches 26 and 27 are usually transistor circuits, for example as described in FIG. 4 of the above mentioned U.S. Pat. No. 3,885,097. In fact a description of the circuit associated with the graphical input tablet of FIG. 1 of the present specification and their operation is described in more detail in U.S. Pat. No. 3,885,097 which also describes alternative circuits which may be used to obtain co-ordinate signals from the tablet.

If the sheet 10 is made of a material which has a resistance which varies with pressure, such as Dynacon or Grey Magic (both trademarks) pressure sensitive conductive silicone, discrimination can be obtained between the type of contact which occurs when the stylus is used. A relatively low pressure per unit area is typical of the type of contact which occurs when the hand holding the stylus is rested on the sheet 10 but a relatively high pressure per unit area is produced by the stylus. The contact made by the hand, when variable resistance sheet material is used, is of such high resistance that in effect it does not bridge the conducting strips to the layer 18, although when the stylus is used the required bridging action is achieved.

Additionally with such materials the sheet 10 may rest on the conducting strips and need not be held in tension provided it is of sufficiently high resistance not to affect the voltage gradient at right angles to the conductors. Thus the supports 12 and 13 and the clamps 14 and 15 may be replaced by other means for holding the sheet.

A contact made by the stylus 24 when a sheet 10' rests on the conductors and has a resistance which varies with pressure is illustrated in FIG. 5. It can be seen that the sheet becomes compressed in the region of the stylus and this reduces its resistance.

A carbon fibre reinforced layer may be bonded to or may overlay the flexible sheet 10 and since carbon fibres have exceptional mechanical properties the life of the flexible sheet 10 is extended, the elastic limit of its material not being exceeded either so often or to such a degree.

I claim:

1. Apparatus for obtaining signals representative of the co-ordinates of a point indicated in a working area, including a sheet of electrically conductive or resistive material held in position across the surface of a fixed member, the said surface comprising a plurality of parallel conductors spaced apart from each other and supported on a resistive layer by means of insulating supports, resistive means for so connecting with the parallel conductors that when a current is passed between two terminals of the resistive means a voltage gradient is set up from conductor to conductor in the direction at right angles to the conductors, the sheet being held in position adjacent to the said surface, and the sheet being of such material and/or so mounted that when pressed towards the surface by means indicating the position of a point it bridges any of the parallel conductors in the locality of the point to the resistive layer, changeover means for causing current supplied to the apparatus to flow alternately in two paths, a first path in which the current flowing in the resistive means sets up a voltage gradient across the parallel conductors and at right angles thereto, and a second path in which the current flowing in the resistive layer sets up a voltage gradient in a direction parallel to the conductors, and means for deriving first and second signals when the sheet is pressed at a relatively small area to bridge at least one of the parallel conductors to the resistive layer, the first signal being dependent on the voltage of the parallel conductors when current flows in the resistive layer, and the second signal being dependent on the voltage of the resistive layer when current flows in the resistive means, and the first and second signals being representative of first and second co-ordinates of the said small area, respectively.

2. Apparatus according to claim 1 wherein the sheet is held in position in contact with the parallel conductors, the resistive of the sheet being such that the sheet does not materially affect the voltage gradient set up from conductor to conductor when a current is passed between the said two terminals of the resistive means.

3. Apparatus according to claim 1 wherein the resistive means comprises a pair of elongated resistive members positioned in contact with the parallel conductors at right angles thereto and at or adjacent to opposite ends thereof.

4. Apparatus according to claim 1 wherein the resistive layer comprises a homogeneous layer of resistive material with connections formed by elongated conductors in contact with a pair of opposite edges of the layer.

5. Apparatus according to claim 1 wherein the material of the sheet is resistive and the resistance of the material varies with pressure.

* * * * *